United States Patent
Ruske

[15] 3,694,443
[45] Sept. 26, 1972

[54] PROCESS FOR THE PRODUCTION OF 4-CHLORO-6,7-PHTHALOYLQUINAZOLINE DERIVATIVES

[72] Inventor: Manfred Ruske, Ludwigshafen, Germany

[73] Assignee: Badische Anilin- & Soda-Fabrik Aktiengesellschaft, Ludwigshafen/Rhine, Germany

[22] Filed: March 4, 1970

[21] Appl. No.: 16,568

[30] Foreign Application Priority Data

March 6, 1969 Germany..........P 19 11 305.4

[52] U.S. Cl. ............................................. 260/251 Q
[51] Int. Cl. ............................................. C07d 51/48
[58] Field of Search ............ 260/25 A, 25 Q, 256.4 Q

[56] References Cited

UNITED STATES PATENTS

| | | | |
|---|---|---|---|
| 2,525,380 | 10/1950 | Sutter et al. | 260/262 |
| 2,530,025 | 11/1950 | Moergeli et al. | 260/251 |
| 2,840,560 | 6/1958 | Sutter | 260/256.4 |

Primary Examiner—Alex Mazel
Assistant Examiner—R. V. Rush
Attorney—Johnston, Root, O'Keeffe, Keil, Thompson and Shurtleff

[57] ABSTRACT

Production of 4-chloro-6,7-phthaloylquinazoline derivatives by reaction of 2-acylamino-3-cyanoanthraquinones with hydrogen chloride and phosgene in the presence of N,N-dialkyl carboxylic amides. The 4-chloro-6,7-phthaloylquinazoline derivatives are valuable dyestuff intermediates.

5 Claims, No Drawings

PROCESS FOR THE PRODUCTION OF 4-CHLORO-6,7-PHTHALOYLQUINAZOLINE DERIVATIVES

This invention relates to a new and advantageous process for the production of chloroquinazoline derivatives which may be used for example as intermediate for the production of dyes, from 3-cyanoanthraquinones.

A process for the production of 2-phenyl-4chloro-6,7-phthaloylquinazoline is described in U.S. Pat. No. 2,530,025 according to which 2-benzoylaminoanthraquinone-3-nitrile is treated in an inert solvent or diluent with phosphorus pentachloride at a temperature rising from 110° to 185°C.

This known method has the disadvantage that the reactants are partly decomposed under the extreme reaction conditions and in consequence the chloroquinazoline derivative is contaminated by phosphorus compounds, which interferes with the further processing of the product, for example into dyes.

Since moreover the use of phosphorus pentachloride in industry offers difficulties owing to the hydroscopic properties and strongly corrosive action of this compound and since the solvent used in the reaction can only be recovered by troublesome operations, a process for the production of chloroquinazoline derivatives in which the said disadvantages are avoided has been much sought after.

I have now found that chloroquinazoline derivatives can be prepared particularly advantageously by treating a 3-cyanoanthraquinone which contains an acylated amino group in the 2-position in an inert solvent or diluent with at least a molar amount (with reference to the 3-cyanoanthraquinone) of hydrogen chloride and phosgene at a temperature of from 50° to 150°C, preferably from 90° to 105°C, in the presence of an N,N- disubstituted carboxylic amide.

Compounds which bear an acetylamino or benzoylamino group in the 2-position are suitable as 3-cyanoanthraquinones. The following 3-cyanoanthraquinones are given by way of example:

2-benzoylamino-3-cyanoanthraquinone,
2-acetylamino-3-cyanoanthraquinone,
2-(4'-chlorobenzoylamino)-3-cyanoanthraquinone,
2-(3'-bromobenzoylamino)-3-cyanoanthraquinone,
2-(3'-trifluoromethylbenzoylamino)-3-cyanoanthraquinone
and 2-(4'-phenylbenzoylamino)-3-cyanoanthraquinone.

Of these compounds, 2-benzoylamino-3-cyanoanthraquinone is of particular industrial interest as starting material.

Both hydrogen chloride and phosgene are used in at least molar amounts with reference to 3-acylaminoanthraquinone. It is advantageous to use these gases in excess, for example in 1.2 to 15 times the molar amount, the ratio of hydrogen chloride to phosgene being kept approximately in the ratio of their molecular weights.

The inert solvent or diluent should be anhydrous. It is preferably used in excess in order to ensure satisfactory distribution of the phosgene and hydrogen chloride in the reaction mixture. Since soluble intermediate stages are formed during the reaction, an amount of 5 to 15 times that of the 3-acylaminoanthraquinone, is generally sufficient. Examples of suitable solvents or diluents are nitrobenzene, chlorobenzene, ortho-dichlorobenzene, trichlorobenzene and toluene.

The 3-acylaminoanthraquinone according to the new process is treated in the said solvent or diluents at temperatures of from 50° to 150°C, preferably from 90° to 105°C, with hydrogen chloride and phosgene in the presence of N,N-substituted carboxylic amide. The following N,N-disubstituted carboxylic amides are given as examples: N,N-dimethylformamide, N,N-diethylformamide, N,N-dibutylformamide, N,N-diethylacetamide, N,N-dimethylpropionamide and N,N-dimethylbenzamide. These disubstituted carboxylic amides may be used for example in 0.1 to 1 molar amount with reference to 3-acylaminoanthraquinone.

The reaction is over within about two to ten hours in the preferred temperature range of from 90° to 105°C. The chloroquinazoline derivative may be isolated (after excess phosgene has been removed) for example by cooling the reaction mixture to 20° to 30°C, the product being suction filtered and dried, remainders of solvents which are not volatile being removed for example by washing with methanol.

Since chloroquinazoline derivatives are prepared in high purity by the new process, the said processing may be omitted in many cases and the chloroquinazoline may be used for further reactions either after partial or complete removal of the solvent by distillation or immediately in the solvent.

The advantageous result of the process according to the invention is surprising because other halogenating agents such as thionyl chloride or phosphorus oxychloride do not give any useful result and the smooth formation of the chloroquinazoline derivates from the starting material was not to be expected under the mild conditions of the process according to the invention.

The following Examples illustrate the invention. The parts and percentages specified in the Examples are parts by weight and percentages by weight.

EXAMPLE 1

One thousand twenty parts of nitrobenzene, 130 parts of 2-benzoylamino-3-cyanoanthraquinone and 14.6 parts of N,N-dimethylformamide are heated at 80°C in a stirred pressure vessel having two gas inlet pipes for hydrogen chloride and phosgene and a reflux condenser having brine cooling. While the temperature is rising from 80° to 95°C, 5 parts of hydrogen chloride and 14.3 parts of phosgene are passed in per hour within 1 hour at 80° to 95°C and within 4 hours at 95° to 98°C. The excess phosgene is blown off with nitrogen. The reaction mixture is cooled to 20°C and suction filtered through a filter stone. The residue is washed with nitrobenzene and methanol in portions and dried at 90°C. About 125 parts (91.2 percent of the theory) of 2-phenyl-4-chloro-6,7-phthaloylquinazoline is obtained having a chlorine number of about 9.4 percent.

According to U.S. Pat. No. 2,530,025 only 76 percent of the theory of 2-phenyl-4-chloro-6,7-phthaloylquinazoline is obtained (with reference to the 2-benzoylamino-3-cyanoanthraquinone) of which the analysis is:

calculated for $C_{22}H_{11}ONCl$
C 68.9 H 3.3 O 11.5 N 7.7 Cl 8.6 P 0.8
found: 71.2 2.96 8.65 7.55 9.6 —

EXAMPLE 2

Seventy parts of 2-benzoylamino-3-cyanoanthraquinone in 600 parts of o-dichlorobenzene and 7.9 parts of N,N-dimethylformamide are heated to 65°C in an apparatus as described in Example 1. As the temperature is raised to 105°C, 5.9 parts of hydrogen chloride and 15.4 parts of phosgene per hour are passed in for 6 hours. The excess phosgene is then blown out. Suction filtration is carried out at 20°C and the residue is stirred with 600 parts of methanol, suction filtered, washed with methanol and dried at 90°C. About 67 parts (90.6 percent of the theory) of 2-phenyl-4-chloro-6,7-phthaloylquinazoline is obtained.

EXAMPLE 3

Eight hundred parts of nitrobenzene and 85.6 parts of 2-(4'-phenylbenzoylamino)-3-cyanoanthraquinone are heated to 95°C in a stirred pressure vessel. 9.5 parts of N,N-dimethylformamide is introduced at this temperature. Twenty parts of phosgene and 7 parts of hydrogen chloride are introduced per hour while mixing well. The internal temperature is raised in 30 minutes to 105° to 110°C and kept for 5 to 6 hours at 110° to 115°C. Excess phosgene is blown out with nitrogen. The reaction mixture is worked up as described in Example 1. Seventy-four parts of 2-(4'-phenyl)-phenyl-4-chloro 6,7-phthaloylquinazoline is obtained having a chlorine number of 7.9 percent (calculated 7.85 percent) and a melting point of 290° to 291°C.

EXAMPLE 4

A mixture of 350 parts of nitrobenzene and 38.6 parts of 2-(4'-chlorobenzoylamino)-3-cyanoanthraquinone is heated to 80°C and 15 parts of N,N'-diethylformamide is added. While mixing well, 10 parts of phosgene and 3.6 parts of hydrogen chloride are passed in per hour and the temperature is kept for 6 hours at 100° to 105°C. Excess phosgene is expelled with nitrogen and the mixture is worked up analogously to Example 1. 32 to 33 parts of 4,4'-dichloro-2-phenyl-6,7-phthaloylquinazoline is obtained having a chlorine content of about 16 percent.

EXAMPLE 5

Three parts of N,N-dimethylformamide is added at 80°C to a mixture of 280 parts of nitrobenzene and 27.4 parts of 2-(3'-methylbenzoylamino)-3-cyanoanthraquinone. The whole is heated to 90°C and then for 5 to 6 hours at 100° to 105°C, 10 parts of phosgene and 3.6 parts of hydrogen chloride being introduced per hour. The dissolved reaction product is precipitated when the excess phosgene is expelled and the reaction mixture is cooled to 15° to 20°C. 18 parts of 2-(3'-tolyl)-4-chloro-6,7-phthaloylquinazoline is obtained having a melting point of 256° to 257°C.

EXAMPLE 6

41.9 parts of 2-(3'-trifluoromethylbenzoylamino)-3-cyanoanthraquinone and 5 parts of N,N-dimethylformamide are introduced at 80°C into 500 parts of nitrobenzene. The whole is heated to 90°C and 15 parts of phosgene and 5.4 parts of hydrogen chloride are passed in per hour. The reaction period is 5 to 6 hours at 100° to 105°C. The phosgene is expelled and the product is isolated as described in the foregoing Examples. 19.4 parts of 2-(3'-trifluoromethylphenyl)-4-chloro-6,7-phthaloylquinazoline is obtained having a melting point of 227° to 228°C.

I claim:

1. A process for the production of a 4-chloro-6,7-phthaloylquinazoline derivative which comprises treating a 2-cyanoanthraquinone substituted in the 2-position by acetylamino, benzoylamino or benzoylamino which is further substituted in its phenyl ring in the 3 or 4 position by chlorine, bromine, phenyl, methyl or trifluoromethyl, while in an anhydrous inert diluent with at least a molar amount, with reference to the 3-cyanoanthraquinone, of hydrogen chloride and phosgene at a temperature of from 50° to 150°C. in the presence of an N,N-dialkyl carboxylic amide having 1 to 4 carbon atoms in each alkyl group and a carboxylic residue derived from an alkanoic acid of 1 to 3 carbon atoms or benzoic acid.

2. A process as claimed in claim 1 carried out at a temperature of from 90° to 105°C.

3. A process as claimed in claim 1 wherein N,N-dimethylformamide is used as the N,N-disubstituted carboxylic amide.

4. A process as claimed in claim 1 wherein 2-benzoylamino-3-cyanoanthraquinone is used as the 3-cyanoanthraquinone.

5. A process as claimed in claim 1, wherein the N-N-dialkylcarboxylic amide used is selected from the group consisting of N,N-dimethylformamide, N,N-diethylformamide, N,N-dibutylformamide, N,N-diethylacetamide, N,N-dimethylpropionamide and N-N-dimethylbenzamide.

* * * * *